April 22, 1958     O. P. WERLE     2,831,256
MULTIPLE BLOCK DISTANCE GAUGE
Filed Oct. 14, 1954
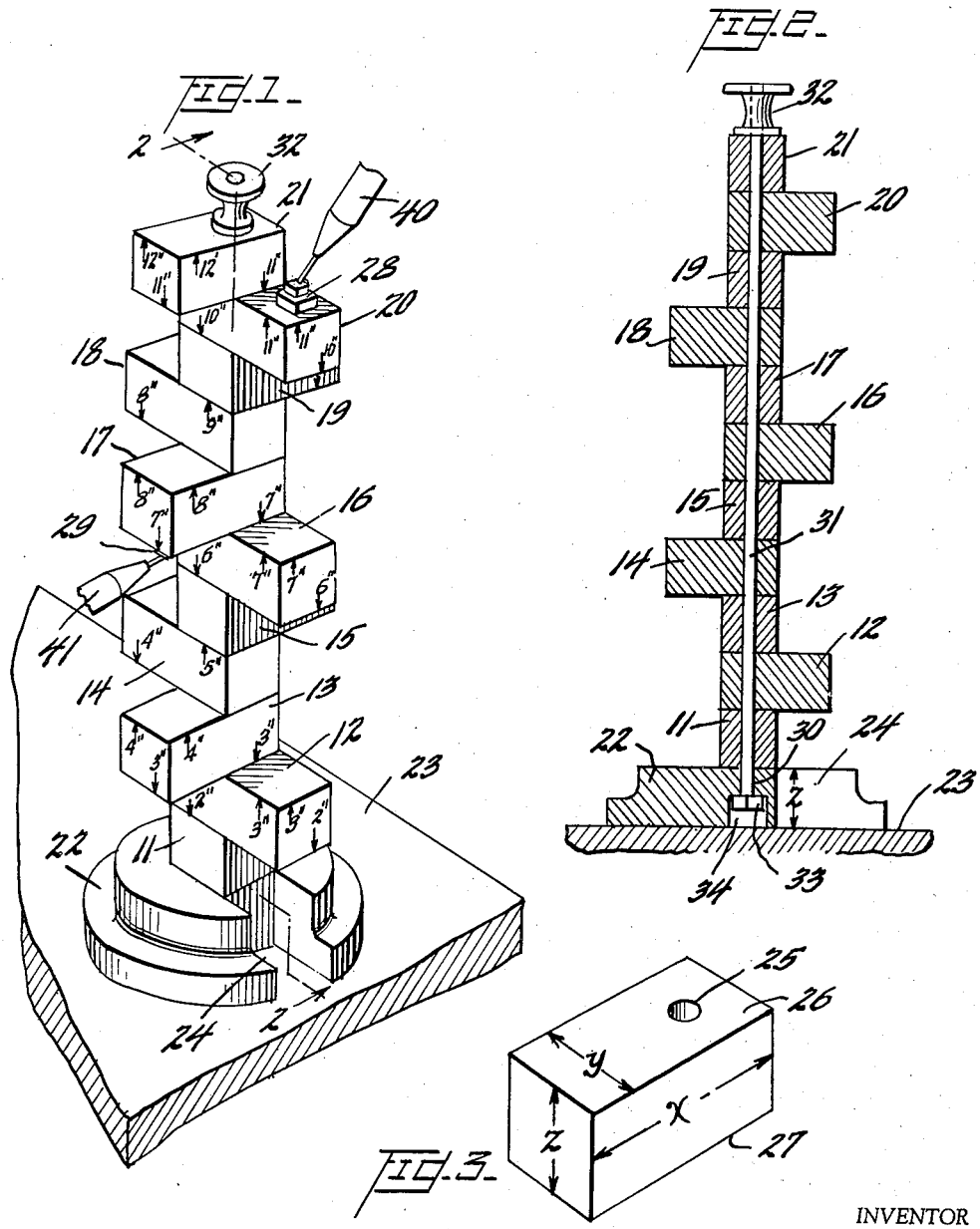
INVENTOR
*Otto P. Werle,*
BY *Paris and Haskell*
ATTORNEYS

United States Patent Office 2,831,256
Patented Apr. 22, 1958

2,831,256
MULTIPLE BLOCK DISTANCE GAUGE

Otto P. Werle, Oxon Hill, Md.

Application October 14, 1954, Serial No. 462,160

4 Claims. (Cl. 33—168)

The present invention relates generally to the art of gauging, and more particularly to a multiple increment distance gauge.

In the art of precision distance gauging, the usual manner of establishing precise measurements for comparison purposes is to assemble a plurality of precision gauge blocks whose combination makes up the desired measurement. Utilizing this assembly as a reference standard, comparator gauges are set in accordance with the dimesion of the assembly, and the size or accuracy of work pieces may then be tested on the comparator gauge. The latter usualy functions to detect the presence and extent of error in the dimension of the work piece being checked. Since the usual precision gauge blocks are cubic or rectangular in form, they may be readily lapped to extremely close tolerances. For example, the established accuracies of these gauge blocks are $\pm 2 \times 10^{-6}$ inch for what is termed in the trade "AA" accuracy, $\pm 4 \times 10^{-6}$ inch for "A" accuracy, and $\pm 8 \times 10^{-6}$ inch for "B" accuracy. It can thus be seen that by use of such precision gauge blocks as standards, machine work can be checked to extremely close tolerances.

Standard guage blocks of the character hereinabove indicated are particularly useful and convenient of use in establishing relatively small reference distances, of the order of an inch or two or less. However, when it is desired to establish a standard for larger distances, for example of the order of six inches or twelve inches, it is apparent that the task of associating a correspondingly larger number of blocks to total the desired dimension becomes accordingly more difficult and time consuming. Additionally, the greater number of gauge blocks to be assembled correspondingly introduces a greater probability of error, since the accuracy of the assembly depends in part upon the skill of the operator in wringing on successive blocks into perfect surface contact. Also, since the gauge blocks are not perfect and contain some error, it is a matter of chance as to whether the errors in the several blocks add or cancel. In using a large number of blocks, if the errors add, it can be seen that a sizable overall error may result, such as to make the entire operation a failure. Although the problems herein stated become more actue as the dimension to be established becomes greater, it can be seen that in a relative way the same situation prevails in establishing a gauging or reference stance of the order of three inches or more inches, as compared with a dimension of less than one inch.

By the present invention, the foregoing difficulties and disadvantages of establishing reference distance standards by the use of precision gauge blocks are overcome, to the degree that for any distance measurement the operator need build up only small distances, usually less than inch, employing but few blocks. Basically, the present invention contemplates the permanent or semi-permanent association of a plurality of precision gauge blocks, of preferably equal size, into a reference stand. The blocks comprising this stand are arranged in an off-center and angularly offset relation to each other so that each block has two of its opposed precision surfaces available as a gauging reference, or for the wringing on of blocks appropriate for making up any distance intermediate the increment between two spaced surfaces of the stand's blocks. Thus, for example, if each block in the stand is a precision one inch block, the stand will provide surfaces available for reference measuring and the wringing on of fractional blocks spaced at one inch increments. Since the blocks of the stand are arranged to be offset from each other at each block increment the adjacent surfaces of the two adjacent blocks are available facing in opposite directions, thereby permitting reference distances to be established in either direction along the stand. The stand may be any length desired, and the blocks thereof may be any size desired, and they may be chosen to provide equal or unequal increments along the stand, all depending on the requirements and nature of the work of the particular shop employing the standard.

A primary advantage of employing a permanent or semi-permanent assembly of gauge blocks such as indicated above is the facility by which a reference standard of any desired distance dimension may be established, it being necessary only to wring on to the desired incremental step the appropriate fractional blocks necessary to describe the precise distance desired. Another advantage is accuracy. First, the number of gauge blocks which must be manipulated by the operator is diminished, hence minimizing the possibility of imperfect surface contact between adjacent blocks. Second, by carefully choosing the blocks used at each step in the stand assembly, the inherent errors in the blocks can be minimized by choosing successive blocks whose directions of error tend to cancel.

Accordingly, one object of the present invention is to provide a permanent or semi-permanent assembly of precision gauge blocks for facilitating the establishment of distance reference standards for gauging operations.

Another object of the present invention is to provide a permanent or semi-permanent assembly of gauge blocks which affords a plurality of reference increments of distance.

Another object of the present invention is to provide a permanent or semi-permanent assembly of gauge blocks which affords a plurality of reference increments of distance, and wherein the reference increments are available in either direction along the assembly, or in both directions simultaneously.

Still another object of the present invention is to provide a permanent or semi-permanent assembly of gauge blocks which affords a plurality of reference increments of distance, and from which reference increments intermediate reference distances may be established by the use of auxiliary gauge blocks which are fractional with respect to said increments.

A still further object of the present invention is to provide a gauge block which may be associated with like blocks to form a permanent or semi-permanent assembly of blocks of the type indicated.

Other objects and advantages of the present invention will be apparent to those skilled in the art from a consideration of the following exemplary specific embodiment of the present invention had in conjunction with the accompanying drawings, in which like numerals refer to like or corresponding parts, and wherein:

Fig. 1 is a perspective view of a stand of assembled gauge blocks illustrating one specific embodiment of the present invention;

Fig. 2 is a vertical sectional view of the stand shown in Fig. 1, taken along the line 2—2 thereof with blocks 28 and 29 omitted; and Fig. 3 is an enlarged perspective view of a gauge block such as used in the stand assembly shown in Figs. 1 and 2.

For the purpose of illustrating the present invention, the specific embodiment herein described is particularly adapted for use in surface plate work for establishing height references from at datum plane. However, it is understood that this embodiment of the invention is merely exemplary, and as will be apparent to those skilled in the art, the present invention is applicable to most all types of gauge block reference work.

Referring to the drawings, the gauge block stand of the present invention is shown in Figs. 1 and 2. As shown, the stand comprises a plurality of precision gauge blocks, in this instance eleven blocks numbered 11 through 21. Each of these blocks is precision lapped at least on one pair of opposite faces, namely those faces which contact or abut adjacent blocks and thus represent precision increments of distance on the stand. In order to facilitate surface plate work, for which the present embodiment is adapted, the stand further includes a base 22 which is likewise precision lapped on its opposed faces, namely that face resting on the surface plate or datum plane 23 and the opposite face contacting block 11. This base represents the first precision increment of distance on the stand. For a purpose to be hereinafter explained, the base 22 is notched at 24.

In the present embodiment, each of the blocks 11 through 21 is identical, and for the purposes of illustration one of the blocks is shown in enlarged detail in Fig. 3. The height dimension of the block, $z$ in the drawing, may be chosen to be any desired value, it representing the distance increment of the block on the stand, 26 and 27 denoting the opposite precision lapped surfaces. The length dimension of the block, $x$ in the drawing, must be greater than the width dimension, $y$ in the drawing, by that amount which affords a sufficient overhang of the block from the central core of the assembled stand, to enable the fractional blocks to be wrung on, as shown at 28 and 29 of Fig. 1. A relation of $x=2y$ is preferred. The width dimension $y$ must itself be such as to provide sufficient surface area to enable the wringing on of the fractional blocks 28, 29. In order to enable the blocks 11 through 21 to be brought into a permanent or semi-permanent assembly, each block is provided with a hole 25 extending between surfaces 26 and 27 along the height dimension. And if it is desired that the assembled stand obtain the symmetry shown in Fig. 1, the hole 25 must be located in the middle of the width dimension, and in from one end of the length dimension by an amount equal to one half the width dimension.

To assemble the stand, the first block 11 is wrung on into perfect surface contact with the upper surface of the base 22. Then the second block 12 is wrung on into perfect surface contact with the first block 11, and likewise with the remainder of the blocks. The holes 25 through each block and the hole 30 through the base are brought into alignment, rod 31 may then be slipped through the aligned holes, and threaded handle 32 applied to the threaded end of the rod, drawing the head 33 of the rod into the base recess 34.

As is apparent from the drawings, each of the blocks 11 through 21 is angularly offset from the adjacent blocks, preferably by a rotational amount of 90 degrees in one direction of rotation. In this manner, each standard distance increment on the stand is defined by two adjacent precision surfaces facing in opposite directions with adequate working space between aligned overhanging block sections. Thus, measurements may be made from an underneath face or from a top face, as desired, and similarly fractional blocks making up dimensions intermediate the set increments of the stand may be wrung on to either top surfaces, as shown at 28, or underneath surfaces, as shown at 29. Therefore, in order to facilitate the use of the present stand and to provide a maximum protection against error, adjacent each precision measuring surface there is provided a notation of the height of that surface, as indicated in the drawings for the instance of increments of one inch. A 90 degree offset between adjacent blocks is chosen as preferable because it affords the greatest surface area for wringing on fractional blocks. However, any amount of offset, greater or less than 90°, may be chosen as desired. In any event it is preferable to arrange the blocks 11 through 21 into their final offset arrangement before completely tightening handle 32 on rod 31 in assembling the stand.

In using the stand of the present invention for surface plate work, the assembled stand is placed with its base 22 in contact with the datum plane 23. It is an important aspect of the present invention, that in accordance with its teachings, reference distances from the datum plane may be established in either direction along the stand, i. e., downwardly from an underneath surface of a reference block as at 29, or upwardly from a top surface of a reference block as at 28. Because of this feature, the measuring heads 40 and 41 of the usual surface plate comparator gauges may be set for any desired distance from the surface plate for performing either top checking measurements as head 40, or underneath checking measurements as head 41. An additional feature resulting from the arrangement of blocks in the present stand is that at least four comparator gauges may be readily and independently set simultaneously from the four sides of the stand. Thus, four work dimensions to be checked may be simultaneously set up from the stand enabling a consequent saving of time in the checking operations to be performed on the surface plate 23.

In actual operation, the worker selects the basic distance increment appropriate for the work dimension to be checked. He then applies either to the selected top reference surface of the stand, in the case of checking top measurements, or to the corresponding underneath reference surface, in the case of checking underneath measurements, the necessary auxiliary fractional precision gauge blocks, as shown at 28 and 29, to make up the precise measurement to be checked. With this as a standard, the surface plate comparator gauge is then set to delineate this measurement from the datum plane 23, and the work pieces to be checked are then run through the comparison gauging operation with the comparator gauge.

The base 22 for the present surface plate stand has a diameter preferably larger than the crosswise dimension of the remainder of the assembled stand, in order to provide desired stability in operation. As previously stated, the base is notched at 24. This notch is formed to afford the necessary clearance under block 12 for permitting fractional blocks to be applied thereto, and underneath settings of the comparator gauges to be made therefrom. It is apparent, that if desired the area of the base 22 under the working surface of block 13 may also be notched, or a notch in the base may be provided under that block, and not under block 12.

Having thus presented a detailed description of one specific embodiment of the present invention, it is understood that this is for the purpose of facilitating a complete understanding of my invention, and the scope of my invention is not to be construed as limited thereto, for modifications and variations thereof will be apparent to those skilled in the art. For example, although the blocks employed for the present embodiment are rectangular, it is apparent that round cross sectional blocks may be used, or other shaped blocks as desired, so long as the blocks are arranged off-center from each other and successive blocks are rotationally offset to provide the desired top and underneath gauging surfaces. Accordingly, modifications and variations as are within the spirit and scope of the appended claims are contemplated by the present invention.

I claim:

1. A multiple increment distance gauge comprising a plurality of successively wrung precision lapped, substantially rectangular gauge blocks having length dimensions greater than width, each block having a hole running therethrough in the direction of its height dimension, with said hole located in the middle of the width dimension and one half the width dimension length from one end of the block, a base for the gauge, and means for securing all said blocks and base in essentially permanent and relatively fixed assembled relationship, said blocks being arranged in off-center relationship to each other, and successive ones of said blocks each being angularly offset from the preceding block by substantially 90° of rotation in one rotational direction about an axis perpendicular to the wrung surfaces, to provide at each wrung interface opposed lapped gauging surfaces.

2. A multiple increment distance gauge comprising a plurality of successively wrung precision lapped, substantially rectangular gauge blocks having length dimensions greater than width, a base for the gauge, and means for securing said blocks and base in essentially permanent and relatively fixed assembled relationship, successive ones of said blocks each being angularly offset from the preceding block by substantially 90° of rotation in one rotational direction about an axis perpendicular to the wrung surfaces, to provide at each wrung interface opposed lapped gauging surfaces.

3. A multiple increment distance gauge comprising a plurality of successively stacked precision lapped, substantially rectangular gauge blocks having length dimensions greater than width, and means for securing said blocks in essentially permanent and relatively fixed assembled relationship, successive ones of said blocks each being angularly offset from preceding blocks by rotation in one rotational direction about an axis perpendicular to the abutting surfaces of adjacent blocks, to provide at each abutting interface opposed lapped gauging surfaces.

4. A multiple increment distance gauge comprising a plurality of successively stacked precision gauge blocks, and means for securing said blocks in essentially permanent and relatively fixed assembled relationship, said blocks being all arranged in off-center relationship to each other and successive ones of said blocks each being stepped by an angularly offset relation with adjacent blocks about an axis perpendicular to the abutting surfaces of adjacent blocks, to provide a plurality of incremental gauging distances having opposed gauging surfaces.

References Cited in the file of this patent

UNITED STATES PATENTS 2,650,436    Gessler                 Sept. 1, 1953

FOREIGN PATENTS 649,231    Great Britain           Jan. 24, 1951

OTHER REFERENCES

Publication, "Johansson Gage Blocks and Accessories," Catalog No. 17, published by Ford Motor Company, Dearborn, Michigan, effective June 1, 1945. Emphasis on pages 5 and 18.

Publication, American Machinist, page 104, Aug. 30, 1945.